J. H. GRESSOM.
WHEEL HUB.
APPLICATION FILED APR. 27, 1916.
1,227,429.
Patented May 22, 1917.
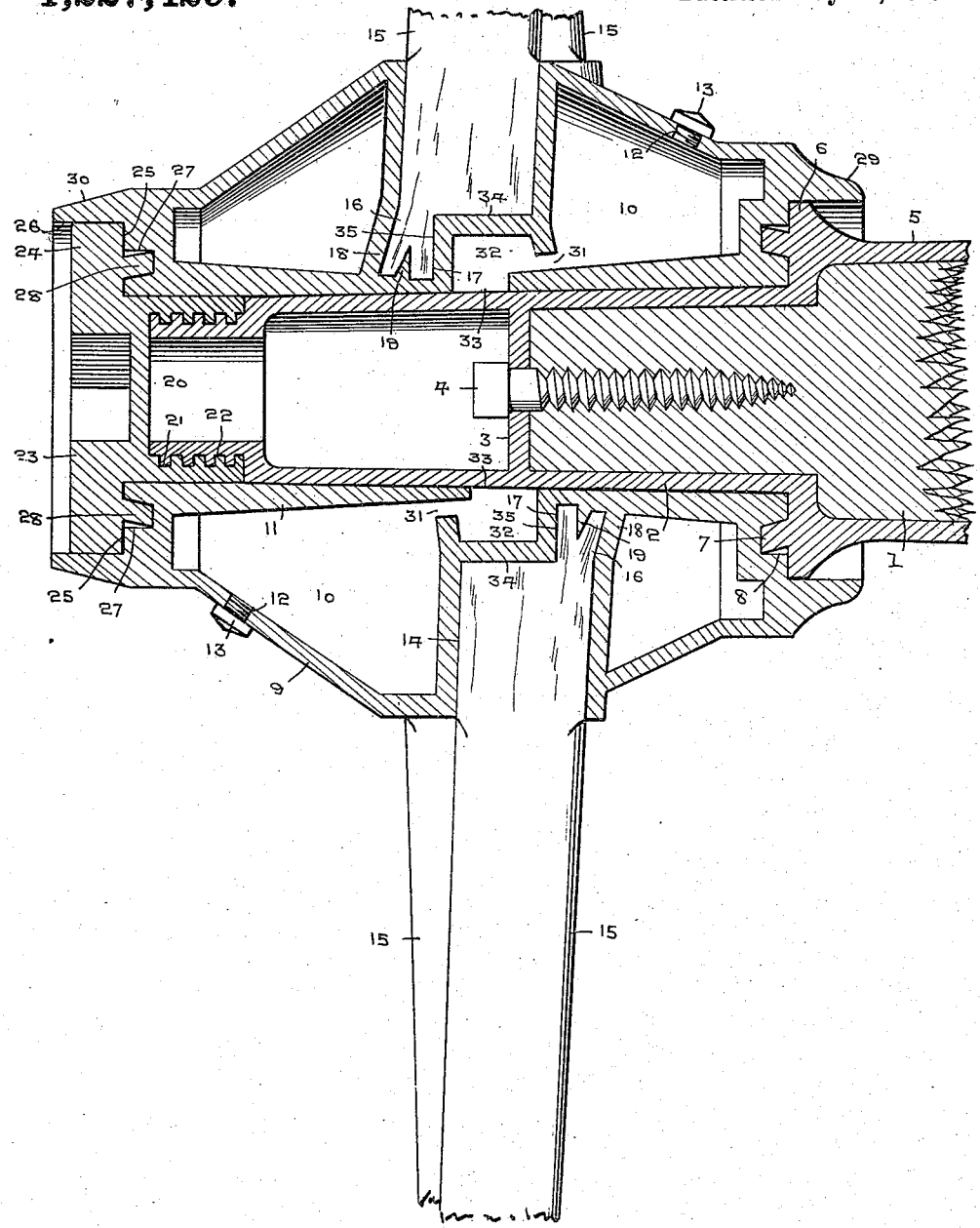
J. H. Gressom — Inventor
Witnesses
By W. J. FitzGerald
Attorney

UNITED STATES PATENT OFFICE.

JAMES HENRY GRESSOM, OF HUDSON, WISCONSIN.

WHEEL-HUB.

1,227,429.  Specification of Letters Patent.  Patented May 22, 1917.

Application filed April 27, 1916. Serial No. 93,992.

*To all whom it may concern:*

Be it known that I, JAMES HENRY GRESSOM, a citizen of the United States, residing at Hudson, in the county of St. Croix and State of Wisconsin, have invented certain new and useful Improvements in Wheel-Hubs; and I do hereby declare the following to be a full, clear, and exact description of the invention, such as will enable others skilled in the art to which it appertains to make and use the same.

My invention relates to new and useful improvements in wheel hubs and my object is to provide a hub which is constructed entirely of metal.

A further object is to provide sockets for the reception of the ends of spokes and arrange means in said sockets for securely locking the spokes within the sockets.

A further object is to so arrange the spokes as to compensate for strain upon parts of the wheel attached to the hub.

A further object is to provide oil chambers within the hub and so arrange the same that the lubricant will be gradually fed on to the spindle on which the hub is mounted.

And a further object is to provide means for preventing dirt, grit, and the like from entering the hub at the ends thereof.

Other objects and advantages will be hereinafter set forth and more particularly pointed out in the accompanying specification.

In the accompanying drawing,

The figure is a central longitudinal sectional view through a hub and supporting spindle therefor.

Referring to the drawing 1 indicates an axle which may be constructed of wood, or other suitable material, to which is attached my improved form of spindle or skein 2, said spindle being hollow and having a partition 3 which abuts against the end of the axle 1 and is secured to the axle in any preferred manner as by introducing a wood screw 4 through the partition and into the end of the axle, or any other suitable securing means may be employed as deemed most expedient.

The spindle 2 at its union with the sleeve portion 5 is provided with a radial shoulder 6, on the outer face of which is formed a peripheral flange 7, said flange being flared outwardly from its integral end so as to rest at an angle to the face of the shoulder 6, said flange being adapted to enter a groove 8 in the inner end of my improved form of hub structure 9.

The hub 9 is preferably constructed of metal and provided with cavities 10 between the outer shell of the hub and the boxing portion 11 thereof into which cavities is to be introduced any suitable form of lubricant, said lubricant being introduced into the cavities through openings 12 which are normally closed by means of plugs 13 which are threaded into the openings.

Extending radially around the hub and preferably at its longitudinal center are a plurality of sockets 14 into which are to be introduced spokes 15, preferably of wood, said sockets being preferably in staggered relation one with the other and so arranged that one half of the spokes will extend at right angles to the axial center of the hub while the other half of the spokes will extend at a slight angle to the axial center of the hub, said spokes being arranged alternately and by extending each alternate spoke at a slight inward angle, the wheel structure will be fully braced against lateral strain and the wheel held against undue dishing.

It will be understood of course that the spokes may be oppositely inclined from their connection with the hub to their outer ends as the occasion may require but as before stated one set of spokes preferably extend in a straight line from their inner to their outer ends, while the remainder are at an angle.

In order to securely lock the ends of the spokes within the sockets 14, each socket is provided with an extension 16 at the edge thereof adapted to receive the greatest amount of strain, said extension entering a seat 17, the wall 18 of which is flared or inclined leaving the inner end of the seat of greater dimensions than the outer end thereof, the base of the seat having a wedge 19 extending upwardly therefrom, the face thereof adjacent the inclined wall 18 being likewise tapered, the pointed end of the wedge causing the extension 16 to split, and in view of the taper of the wedge the split portion of the extension engaging said face will be forced into engagement with the inclined wall 18, thereby firmly wedging that portion of the extension between said inclined wall and the tapered face of the wedge and securely locking the spoke against endwise movement.

The spindle proper terminates a distance from the outer end of the hub and the extreme outer end is provided with a reduced portion 20, the exterior face of which is provided with threads 21 which are adapted to be engaged with threads 22 interiorly of a nut 23, said nut when screwed on to the reduced portion 20 supplying the bearing surface for the boxing removed from the spindle by reducing the end portion thereof.

The outer end of the nut is provided with a radial head 24 which fits against a shoulder 25, of a cavity 26 in the outer end of the hub, said shoulder having a groove 27 in the face thereof with which engages a flange 28 on the inner face of the radial head 24, said flange being flared outwardly from its connection with the head to its outer edge and when seated in the groove prevents dirt, grit, and the like entering the hub at this point.

The integral bands 29 and 30 at the inner and outer ends of the hub, project a distance beyond the shoulder 6 and the radial head 24 of the nut, when the hub is properly mounted upon the spindle, so that any water or dirt deposited upon the hub will pass off of the hub at points beyond the shoulder and head respectively.

The lubricant from the cavities 10 is gradually fed on to the sprindle 2 by providing ports 31 adjacent the boxing 11, which ports communicate with a sub chamber 32, said sub chamber having an opening 33 communicating with the interior of the boxing 11, said opening being formed through the wall of the boxing, and it will be readily seen that as the wheel rotates the lubricant will flow through the ports into the sub chambers and thence through the openings 33 on to the spindle, and as the lubricant is fed slowly into the sub chambers, the wheel may be used for an indefinite period without renewing the supply of lubricant. The walls 34 and 35 forming the sub chambers 32 also form rests for the inner ends of spokes and the inner walls of the seats 17 respectively.

By locking the extensions at the inner ends of the spokes into the seats in the manner shown, said spokes will be securely held in engagement with the hub.

It will likewise be seen that by providing the flanges and grooves at the ends of the hub, foreign particles will be excluded from the hub and the leakage of the lubricant from the hub prevented.

It will likewise be seen that by providing the cavities in the hub for forming lubricant chambers that after said chambers are once filled with the lubricant, the wheel may be used for a long period of time without requiring additional lubricant to be placed in the cavities, and furthermore that it does not require the removal of the wheel from the spindle to place lubricant thereon as is necessary when the ordinary form of wheel is used.

Having thus fully described my invention what I claim as new and desire to secure by Letters Patent of the United States, is:—

In a self lubricating hub, an outer shell, a boxing disposed through said shell and provided circumferentially and intermediate its ends with a series of oil outlet openings, the space between said outer shell and boxing serving as an oil well, a series of spoke sockets arranged circumferentially and intermediate the ends of the outer shell, said spoke sockets extending radially inwardly into engagement with the boxing, each of said spoke sockets formed with an oil chamber in its inner end which registers with one of said boxing outlet openings, said oil chambers being each provided with an inlet opening whereby oil can feed from the oil well through the boxing.

In testimony whereof I have signed my name to this specification in the presence of two subscribing witnesses.

JAMES HENRY GRESSOM.

Witnesses:
 GEO. TURNER,
 ELMER WALES.

Copies of this patent may be obtained for five cents each, by addressing the "Commissioner of Patents, Washington, D. C."